(12) United States Patent
Jiang et al.

(10) Patent No.: US 11,204,482 B1
(45) Date of Patent: Dec. 21, 2021

(54) LARGE-APERTURE OPTICAL LENS WITH THREE LENS PIECES

(71) Applicant: YEJIA OPTICAL TECHNOLOGY (GUANGDONG) CORPORATION, Dongguan (CN)

(72) Inventors: Cheng Jiang, Dongguan (CN); Jun She, Dongguan (CN); Jixue Nan, Dongguan (CN)

(73) Assignee: YEJIA OPTICAL TECHNOLOGY (GUANGDONG) CORPORATION, Dongguan (CN)

( * ) Notice: Subject to any disclaimer, the term of this patent is extended or adjusted under 35 U.S.C. 154(b) by 0 days.

(21) Appl. No.: 17/237,367

(22) Filed: Apr. 22, 2021

(30) Foreign Application Priority Data

Aug. 28, 2020 (CN) .......................... 202010884484.6

(51) Int. Cl.
| | | |
|---|---|---|
| *G02B 9/14* | (2006.01) | |
| *G02B 5/00* | (2006.01) | |
| *G02B 1/04* | (2006.01) | |
| *G02B 13/18* | (2006.01) | |
| *G02B 3/04* | (2006.01) | |
| *G02B 3/02* | (2006.01) | |
| *G02B 13/00* | (2006.01) | |

(52) U.S. Cl.
CPC ............... *G02B 9/14* (2013.01); *G02B 1/041* (2013.01); *G02B 3/04* (2013.01); *G02B 5/005* (2013.01); *G02B 13/18* (2013.01); *G02B 3/02* (2013.01); *G02B 13/005* (2013.01)

(58) Field of Classification Search
CPC .......... G02B 13/18; G02B 5/005; G02B 9/14; G02B 1/041; G02B 13/005; G02B 3/02; G02B 3/04

USPC ........ 359/651, 716, 739, 784, 785, 798–800
See application file for complete search history.

(56) References Cited

U.S. PATENT DOCUMENTS

| | | | | | |
|---|---|---|---|---|---|
| 1,485,929 | A | * | 3/1924 | Holst ..................... | G02B 13/00 359/789 |
| 1,658,365 | A | * | 2/1928 | Altman .................. | G02B 13/00 359/784 |
| 3,160,700 | A | * | 12/1964 | Snyder ................... | G02B 13/14 359/356 |
| 3,486,805 | A | * | 12/1969 | Kobayashi ............... | G02B 9/16 359/785 |

(Continued)

FOREIGN PATENT DOCUMENTS

DE     102016203374 A1 * 9/2017

*Primary Examiner* — Evelyn A Lester
(74) *Attorney, Agent, or Firm* — Locke Lord LLP; Tim Tingkang Xia, Esq.

(57) ABSTRACT

An optical lens is provided with three lens pieces. The optical lens includes a diaphragm, a first lens piece having positive focal power, a second lens piece having negative focal power and a third lens piece having positive focal power, arranged in sequence. The first lens piece has an S1 surface and an S2 surface. The second lens piece has an S3 surface and an S4 surface. The third lens piece has an S5 surface and an S6 surface. An S7 surface is provided on a side of the S6 surface away from the S5 surface. A lens frame is provided at the S6 surface or between the S6 and S7 surfaces. The calibers of the Si to S7 surfaces sequentially decrease. An equivalent focal length of the first lens piece is larger than that of the third lens piece. A numerical aperture of the lens is larger than 0.6.

8 Claims, 7 Drawing Sheets

(56) References Cited

U.S. PATENT DOCUMENTS

| | | | | |
|---|---|---|---|---|
| 3,578,847 A * | 5/1971 | Grey | G02B 13/02 | 359/785 |
| 3,762,801 A * | 10/1973 | Baker | G02B 13/00 | 359/716 |
| 3,784,287 A * | 1/1974 | Grey | G02B 13/00 | 359/790 |
| 3,905,686 A * | 9/1975 | Ruben | G02B 9/16 | 359/716 |
| 3,910,685 A * | 10/1975 | DeJager | G02B 13/18 | 359/790 |
| 3,912,379 A * | 10/1975 | DeJager | G02B 9/16 | 359/789 |
| 3,944,337 A * | 3/1976 | Ruben | G02B 9/14 | 359/716 |
| 3,967,884 A * | 7/1976 | De Jager | G02B 9/14 | 359/790 |
| 4,105,308 A * | 8/1978 | Owen, Jr. | G02B 9/14 | 359/716 |
| 4,787,724 A * | 11/1988 | Kudo | G02B 9/14 | 359/739 |
| 4,892,398 A * | 1/1990 | Kudo | G02B 9/16 | 359/708 |
| 5,251,063 A * | 10/1993 | Baumann | G02B 9/16 | 359/355 |
| 5,589,989 A * | 12/1996 | Estelle | G02B 9/16 | 359/785 |
| 5,596,455 A * | 1/1997 | Eckhardt | G02B 13/00 | 359/789 |
| 5,668,671 A * | 9/1997 | Erdmann | G02B 13/14 | 359/356 |
| 5,701,207 A * | 12/1997 | Waketa | G02B 9/02 | 359/716 |
| 6,101,035 A * | 8/2000 | Maruyama | G02B 9/14 | 359/558 |
| 6,977,779 B2 * | 12/2005 | Shinohara | G02B 9/16 | 359/716 |
| 7,196,855 B2 * | 3/2007 | Yamaguchi | G02B 13/0035 | 359/785 |
| 7,330,318 B2 * | 2/2008 | Do | G02B 9/16 | 359/716 |
| 7,362,518 B2 * | 4/2008 | Sun | G02B 9/16 | 359/716 |
| 7,492,533 B2 * | 2/2009 | Miyazaki | G02B 13/18 | 359/739 |
| 7,894,141 B2 * | 2/2011 | Do | G02B 9/16 | 359/716 |
| 7,911,688 B2 * | 3/2011 | Izumi | G02B 13/14 | 359/356 |
| 8,385,009 B2 * | 2/2013 | Chen | G02B 26/125 | 359/785 |
| 10,585,262 B2 * | 3/2020 | Hsueh | G02B 13/0035 | |
| 2007/0229988 A1 * | 10/2007 | Sato | G02B 9/16 | 359/785 |
| 2008/0080065 A1 * | 4/2008 | Asami | G02B 13/0035 | 359/716 |
| 2009/0190236 A1 * | 7/2009 | Do | G02B 13/0035 | 359/716 |
| 2012/0050888 A1 * | 3/2012 | Dai | G02B 13/0035 | 359/716 |
| 2014/0376111 A1 * | 12/2014 | Liao | G02B 13/0035 | 359/716 |
| 2015/0077868 A1 * | 3/2015 | Liao | G02B 13/0035 | 359/716 |
| 2016/0161711 A1 * | 6/2016 | Liao | G02B 13/0035 | 359/716 |

* cited by examiner

LARGE-APERTURE OPTICAL LENS WITH THREE LENS PIECES

CROSS-REFERENCE TO RELATED PATENT APPLICATION

This application claims priority to Chinese Patent Application No. 202010884484.6 filed in China on Aug. 28, 2020. The disclosure of the above application is incorporated herein in its entirety by reference.

TECHNICAL FIELD

The present invention relates to an optical lens, in particular to a large-aperture optical lens with three lens pieces.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the traditional technology, a headlight lens of a car, which makes use of a projection principle, is composed of a light source, a light energy collection element, a cut-off line structure and a convex lens piece.

The newly developed pixel headlight, also referred to as a matrix headlight, makes use of a light digital projection technology, such that the headlight not only has a lighting function, but can also project patterns on the ground, such as weather conditions, road navigation, or other symbols for people outside a car to recognize. An optical system of the pixel headlight mainly includes a pixel element that can emit light (such as a mini LED, a micro LED, an LCD liquid crystal display, a LCOS or a lighted DMD digital micro mirror) and a projection optical lens. In order to make a projection pattern clearly visible, the lens needs to achieve favorable optical performances: eliminating various optical aberrations such as chromatic aberration, field curvature, and astigmatism.

The optical lens in the related art needs to be appropriately combined with a plurality of positive and negative lens pieces, so as to eliminate aberrations. The specific number of optical lens pieces used is related to parameters and performance indicators of the optical lens, as well as optical materials and optical processes used, wherein the number of lens pieces of a slightly complex optical lens can reach more than 10. At present, the number of lens pieces in an optical lens used in a mobile phone is mostly 6 or more, resulting in high cost.

A Cooke three-piece type lens system, as shown in FIG. 1, can have a good correction effect on a variety of aberrations and have better imaging quality, but an originally designed numerical aperture is relatively small, which is generally not more than 0.2. This means that the utilization rate of light energy is low, and the lens pieces need to be adjusted very accurately when in assembly and use, resulting in small error tolerance rate and high use requirements.

The pixel headlight has both the functions of illumination and imaging. On the one hand, higher energy utilization and higher brightness are required. On the other hand, projection imaging has certain image quality requirements, especially for low chromatic aberration. In addition, due to the particularity of automotive applications, the optical lens needs to have higher thermal reliability, better vibration reliability, and lighter weight. In order to further improve market competitiveness, lower cost is required at the same time.

The optical lens in the related art cannot simultaneously meet the performance requirements for high energy utilization, high imaging quality, simple and stable structure, and low cost.

SUMMARY

In view of this, in order to solve the problems in the related art, it is necessary to provide a large-aperture optical lens with three lens pieces, which has high energy efficiency, high imaging quality, simple and stable structure, and low cost in production and use.

To solve the problems existing in the related art, the present invention provides a large-aperture optical lens with three lens pieces. The optical lens comprises a diaphragm, a first lens piece having positive focal power, a second lens piece having negative focal power, and a third lens piece having positive focal power, which are arranged in sequence, wherein two surfaces of the first lens piece are an S1 surface and an S2 surface respectively, two surfaces of the second lens piece are an S3 surface and an S4 surface respectively, and two surfaces of the third lens piece are an S5 surface and an S6 surface respectively; the S1 surface, the S2 surface, the S3 surface, the S4 surface, the S5 surface and the S6 surface are arranged in sequence; an S7 surface is provided on a side of the S6 surface away from the S5 surface, and a lens frame is provided at the S6 surface or between the S6 surface and the S7 surface; the S1 surface, the S2 surface and the S5 surface are all convex surfaces, and the S3 surface is a concave surface;

a distance between the diaphragm and an object focus of the lens is $|ST-F_{obj}|$, and an equivalent focal length of the lens is $f_0$, $|ST-F_{obj}|<0.5f_0$;

the calibers of the S1 surface to the S7 surface sequentially decrease progressively; a curvature radius of the S3 surface is $r_3$, and a curvature radius of the S4 surface is $r_4$, $|r_3|<|r_4|$; a curvature radius of the S5 surface is $r_5$, and a curvature radius of the S6 surface is $r_6$, $|r_5|<|r_6|$; an equivalent focal length of the first lens piece is greater than an equivalent focal length of the third lens piece; and a center distance between the first lens piece and the second lens piece is $G_{12}$, and a center distance between the second lens piece and the third lens piece is $G_{23}$, $G_{12}<G_{23}$; a back focal length of the lens is greater than 5 mm; and a numerical aperture of the lens is greater than 0.6.

Preferably, the S4 surface is a concave surface.

Preferably, the S6 surface is a convex surface.

Preferably, the S1 surface, the S2 surface, the S3 surface, the S4 surface, the S5 surface and the S6 surface are spherical surfaces or aspherical surfaces.

Preferably, the first lens piece, the second lens piece, and the third lens piece are single lens pieces or cemented lens pieces.

Preferably, the first lens piece, the second lens piece, and the third lens piece are glass lens pieces or plastic lens pieces.

Preferably, an Abbe number of the first lens piece is $Vd_1$; an Abbe number of the second lens piece is $Vd_2$; and an Abbe number of the first lens piece is $Vd_3$, $Vd_1-Vd_2>25$, $Vd_3-Vd_2>25$.

The present invention has the following beneficial effects: according to the large-aperture optical lens with three lens pieces, the energy utilization rate can be improved by increasing the numerical aperture, and the brightness of light distribution can be effectively improved; and the optical lens, when being applied to a projection imaging system, has good dispersion performance, and good image resolution, that is, high imaging quality. In addition, there are only three lens pieces used in the lens, such that the production cost is low, the overall structure is simple and stable, the anti-vibration performance is good, and the lens is light in weight. When the respective lens pieces are assembled, the sensitivity to an axial tolerance is low, the assembly difficulty is low, and the use cost is low.

BRIEF DESCRIPTION OF THE DRAWINGS

The invention is described in detail below in conjunction with embodiments and drawings.

Figure 1:
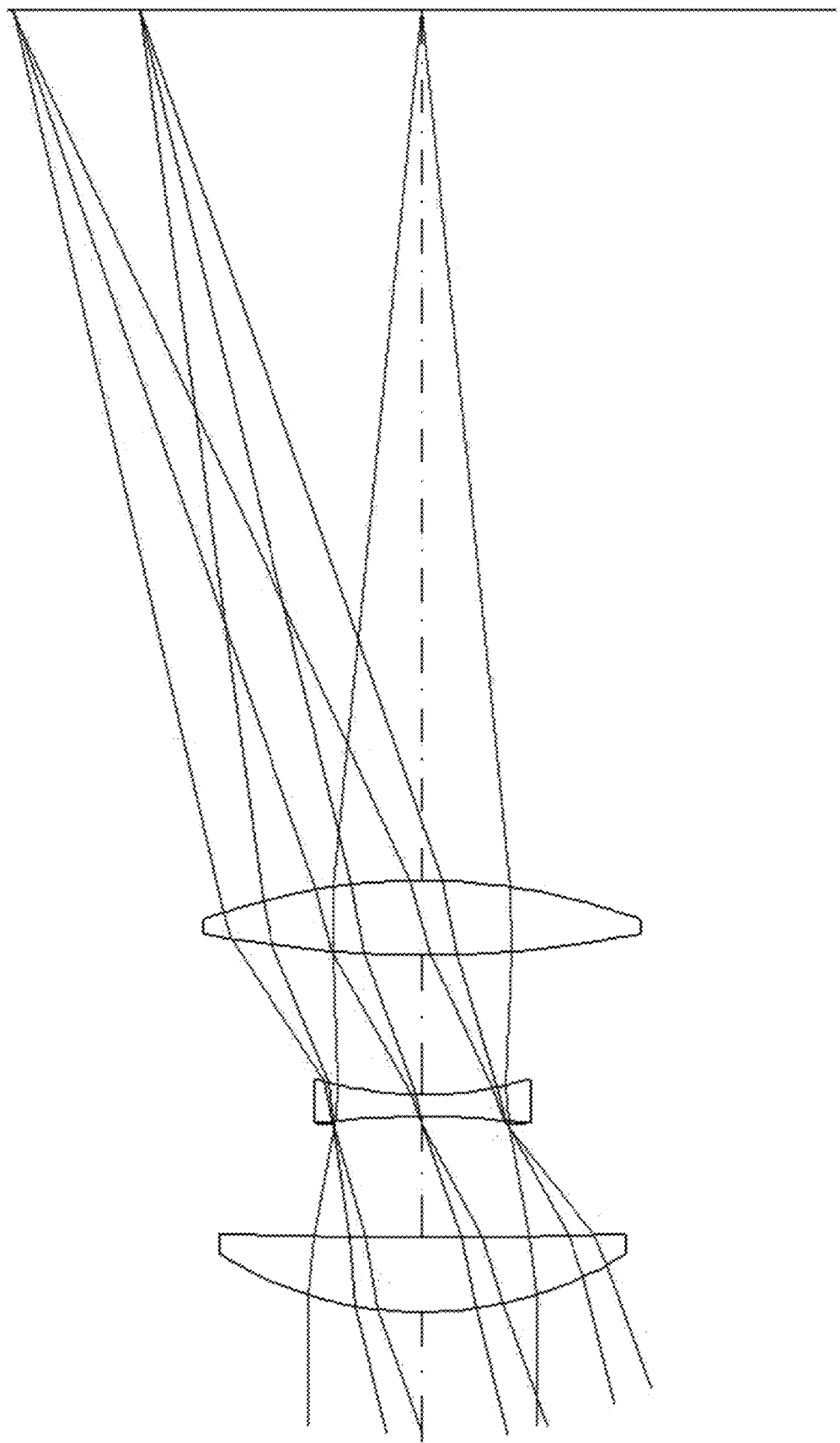
FIG. 1 is a schematic structural diagram of a Cooke three-piece type lens system.

In the drawings, reference symbols represent the following components: 10—diaphragm; 20—first lens piece; 21—S1 surface; 22—S2 surface; 30—second lens piece; 31—S3 surface; 32—S4 surface; 40—third lens piece; 41—S5 surface; 42—S6 surface; 50—S7 surface; 60 lens frame.

DETAILED DESCRIPTION

In order to further understand the features, technical means, and specific objectives and functions achieved by the present invention, the present invention will be described in further detail below with reference to the accompanying drawings and specific embodiments.

Referring to FIG. 1 to FIG. 7, a basic embodiment of the present invention discloses a large-aperture optical lens with three lens pieces. The optical lens comprises a diaphragm 10, a first lens piece 20 having positive focal power, a second lens piece 30 having negative focal power, and a third lens piece 40 having positive focal power, which are arranged in sequence in a light incidence direction. Two surfaces of the first lens piece 20 are an S1 surface 21 and an S2 surface 22, respectively. Two surfaces of the second lens piece 30 are an S3 surface 31 and an S4 surface 32, respectively. Two surfaces of the third lens piece 40 are an S5 surface 41 and an S6 surface 42, respectively. The S1 surface 21, the S2 surface 22, the S3 surface 31, the S4 surface 32, the S5 surface 41 and the S6 surface 42 are arranged in sequence in the light incidence direction. An S7 surface 50 is provided on a side of the S6 surface 42 away from the S5 surface 41, wherein the S7 surface 50 is an image surface, that is, the S7 surface 50 is located at an image focus of the entire optical lens. A lens frame 60 is provided at the S6 surface 42 or between the S6 surface 42 and the S7 surface 50, that is, the lens frame 60 is provided at the S6 surface 42, or between the S6 surface 42 and the S7 surface 50. The lens frame 60 is a vignetting diaphragm. The S1 surface 21, the S2 surface 22 and the S5 surface 41 are all convex surfaces, and the S3 surface 31 is a concave surface.

A distance between the aperture 10 and an object focus of the entire optical lens is $|ST-F_{obj}|$; ST represents a distance between the diaphragm 10 and the center of the entire optical lens; $F_{obj}$ represents a distance between the object focus of the entire optical lens and the center of the entire optical lens; an equivalent focal length of the entire optical lens is $f_0$. In practical applications, the object focus of the entire optical lens may be located inside the first lens piece 20, so the diaphragm 10 is provided near the object focus of the entire optical lens, that is, the following formula is satisfied: $|ST-F_{obj}|<0.5f_0$.

The calibers of the S1 surface 21 to the S7 surface 50 sequentially decrease progressively, that is, the caliber of the entire optical lens gradually decreases from the object side to the image side, $d_i>d_j$, wherein d is a caliber; i<j, in which i is an integer from 1 to 5, j is an integer from 2 to 7; d is the magnitude of the caliber; a curvature radius of the S3 surface 31 is $r_3$, and a curvature radius of the S4 surface 32 is $r_4$, $|r_3|<|r_4|$; an curvature radius of the S5 surface 41 is $r_5$, and a curvature radius of the S6 surface 42 is $r_6$, $|r_5|<|r_6|$; and an equivalent focal length of the first lens piece 20 is greater than an equivalent focal length of the third lens piece 40, that is $f_1>f_3$.

A center distance between the first lens piece 20 and the second lens piece 30 is $G_{12}$, and a center distance between the second lens piece 30 and the third lens piece 40 is $G_{23}$, $G_{12}<G_{23}$; a back focal length of the entire optical lens is greater than 5 mm, that is, a distance between the S6 surface 42 and the S7 surface 50 is greater than 5 mm; and a numerical aperture of the entire optical lens is greater than 0.6.

When in operation, light reaches the S1 surface 21, the S2 surface 22, the S3 surface 31, the S4 surface 32, the S5 surface 41, the S6 surface 42 and the S7 surface 50 in sequence. The optical lens of the present invention can significantly improve the chromatic dispersion performance of a headlight of a vehicle, and reduce the sensitivity of the lens pieces to the axial tolerance during the assembly, thereby achieving a high error tolerance rate during the assembly, and low assembly difficulty.

Based on a classic Cooke three-piece type lens system, as shown in FIG. 1, in a general three-piece type lens or a variant thereof, a diaphragm is usually placed at a middle lens piece, which can reduce or correct common aberrations, such as field curvature, astigmatism, and chromatic aberration, through structural symmetry. However, the use of this structure will result in a smaller numerical aperture on the one hand, and on the other hand, will also result in a large incident angle of main light at the image plane with a large field of view. The luminous intensity of an ordinary light source satisfies the Lambert's cosine law, i.e., reaches the maximum at a 0 degree position, attenuates to 0.5 at a 60 degree position, and is 0 at a 90 degree position, which means that the lens system gets lower energy for the same solid angle.

According to the optical lens of the present invention, the diaphragm 10 is arranged at the object focus of the optical lens, so as to form an image-side telecentric optical path, so that the main light in each field of view is parallel. That is, the incident angle of the main light in each field of view at the image plane, that is, at the S7 surface 50 is 0, which means that the energy utilization rate of the present invention is higher for the same solid angle.

In this embodiment, a back focal length of the entire optical lens is greater than 5 mm, that is, a distance between the S6 surface 42 and the S7 surface 50 is greater than 5 mm. The S4 surface 32 is a concave surface, that is, the second lens piece 30 is a biconcave lens piece; the S6 surface 42 is a convex surface, that is, the third lens piece 40 is a biconvex lens; the S1 surface 21, the S2 surface 22, the S3 surface 31, the S4 surface 32, the S5 surface 41 and the S6 surface 42 are spherical surfaces or aspherical surfaces; the S1 surface 21 to the S6 surface 42 may all be spherical surfaces, or the S1 surface 21 to the S6 surface 42 may all be aspherical surfaces, or the S1 surface 21 to the S6 surface 42 may include a spherical surface and an aspheric surface.

In this embodiment, the first lens piece 20, the second lens piece 30 and the third lens piece 40 are single lens pieces or cemented lens pieces, that is, the first lens piece 20, the second lens piece 30 and the third lens piece 40 may all be single lens pieces, or the first lens piece 20, the second lens piece 30 and the third lens piece 40 are all cemented lens pieces; or the first lens piece 20, the second lens piece 30 and the third lens piece 40 include a single lens piece and a cemented lens piece. The cemented lens piece is also referred to as an achromatic lens, which is formed by cementing two single lens pieces, and has a multicolor imaging performance much higher than that of a single lens piece.

In this embodiment, the first lens piece 20, the second lens piece 30 and the third lens piece 40 are glass lens pieces or plastic lens pieces, that is, the first lens piece 20, the second lens piece 30 and the third lens piece 40 may all be glass lens pieces, or the first lens piece 20, the second lens piece 30 and the third lens piece 40 are all plastic lens pieces; or the first lens piece 20, the second lens piece 30 and the third lens piece 40 include a glass lens piece and a plastic lens piece.

In this embodiment, an Abbe number of an optical material used by the first lens piece 20 is $Vd_1$; an Abbe number of an optical material used in the second lens piece 30 is $Vd_2$; and an Abbe number of an optical material used by the third lens piece 40 is $Vd_3$, $Vd_1-Vd_2>25$, $Vd_3-Vd_2>25$.

Figure 2:
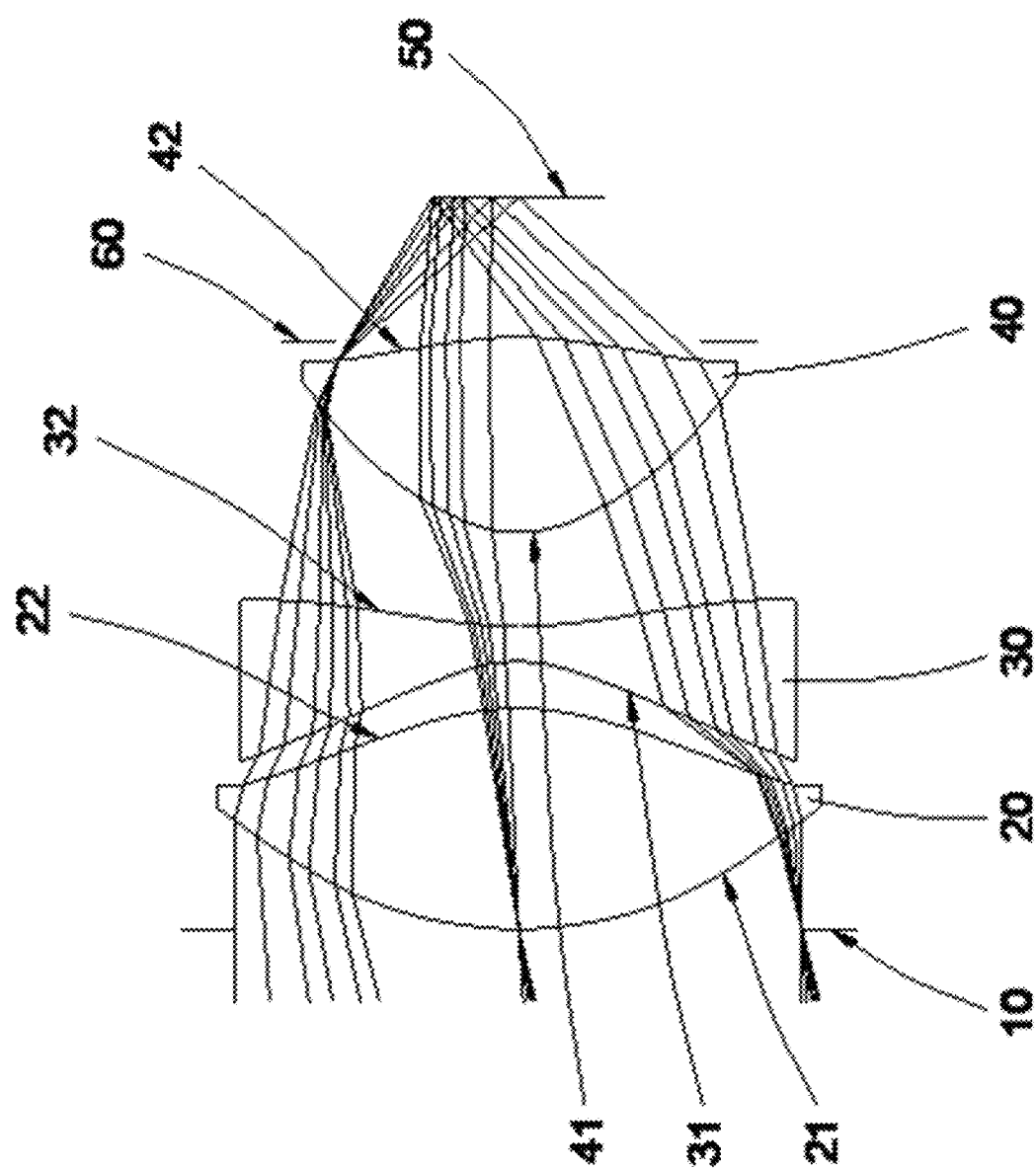
FIG. 2 is a schematic structural diagram of Embodiment 1 of the present invention.

In Embodiment 1, the optical lens structure is shown in FIG. 2. The optical lens is set according to parameters in Table 1, Table 2, Table 3, and Table 4.

TABLE 1

Parameters of each surface in Embodiment 1

| Surface number | Surface type | Curvature radius r (mm) | Thickness (mm) | Refractive index n | Abbe number Vd | Caliber d |
|---|---|---|---|---|---|---|
| Object plane | Spherical surface | Infinite | 25000 | | | |
| Diaphragm | Spherical surface | Infinite | 0.00 | | | 39.931 |
| S1 | Aspherical surface | 25.20 | 15.81 | 1.492 | 57.98 | 39.946 |
| S2 | Aspherical surface | −14.35 | 3.25 | | | 38.878 |
| S3 | Aspherical surface | −9.79 | 2.50 | 1.584 | 27.86 | 36.483 |
| S4 | Aspherical surface | 27.65 | 6.75 | | | 33.539 |
| S5 | Aspherical surface | 9.20 | 13.81 | 1.492 | 57.98 | 28.425 |
| S6 | Aspherical surface | −24.62 | 10.01 | | | 25.600 |
| S7 | Spherical surface | Infinite | 0.00 | | | 12.475 |

The expression of the aspheric surface is as follows:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

wherein z is a vector height of position r on the aspheric surface; c is a paraxial curvature of the aspheric surface, c=1/r; r is a curvature radius; k is a cone coefficient; and A-J are coefficients of higher order terms.

TABLE 2

Parameters of each aspheric surface in Embodiment 1

|  | S1 | S2 | S3 | S4 | S5 | S6 |
|---|---|---|---|---|---|---|
| Cone coefficient k | 25.198 | −7.136 | −5.415 | −25.193 | −2.434 | −24.900 |
| A | −0.898 | 7.71E−06 | 7.34E−07 | −7.24E−06 | 7.11E−05 | 1.34E−05 |
| B | 3.24E−06 | −3.79E−08 | −8.80E−09 | 0 | −1.33E−07 | −5.31E−08 |
| C | −1.23E−08 | 6.08E−11 | 3.09E−11 | 0 | 2.98E−10 | 1.03E−10 |
| D | 0 | 0 | 0 | 0 | −3.28E−13 | 0 |
|  | \multicolumn{6}{c}{Other high-order items are all 0} | | | | | |

TABLE 3

Parameters of an optical lens piece in Embodiment 1

| Parameter | Equivalent focal length $f_0$(mm) | $f_1$ (mm) | $f_2$ (mm) | $f_3$ (mm) | Back focal length | f/EPD | Numerical aperture NA | 1/2 FOV(°) |
|---|---|---|---|---|---|---|---|---|
| Value | 26.28 | 21.33 | −11.96 | 15.68 | 10.014 | 0.658 | 0.76 | 13.2 |

TABLE 4

Constraint relationship of Embodiment 1

| Constraint conditions | Results |
|---|---|
| \|ST-Fobj\| < 0.5f | \|ST-Fobj\| = 7.55 mm, and thus the condition is satisfied. |
| Caliber size di > dj | As can be seen from Table, the condition is satisfied. |
| A lens frame is provided on the S6 surface | The vignetting coefficient of 1/2 FOV is 0.44. |
| \|R3\| < \|R4\| | As can be seen from Table 1, the condition is satisfied. |
| f1 > f3 | As can be seen from Table 3, the condition is satisfied. |
| \|R5\| < \|R6\| | As can be seen from Table 1, the condition is satisfied. |
| G12 < G23 | As can be seen from Table 1, the condition is satisfied. |
| The back focal length is greater than 5 mm | As can be seen from Table 3, the back focal length is 10.01 mm, and thus the condition is satisfied. |
| Numerical aperture NA | 0.76 |

Figure 3:
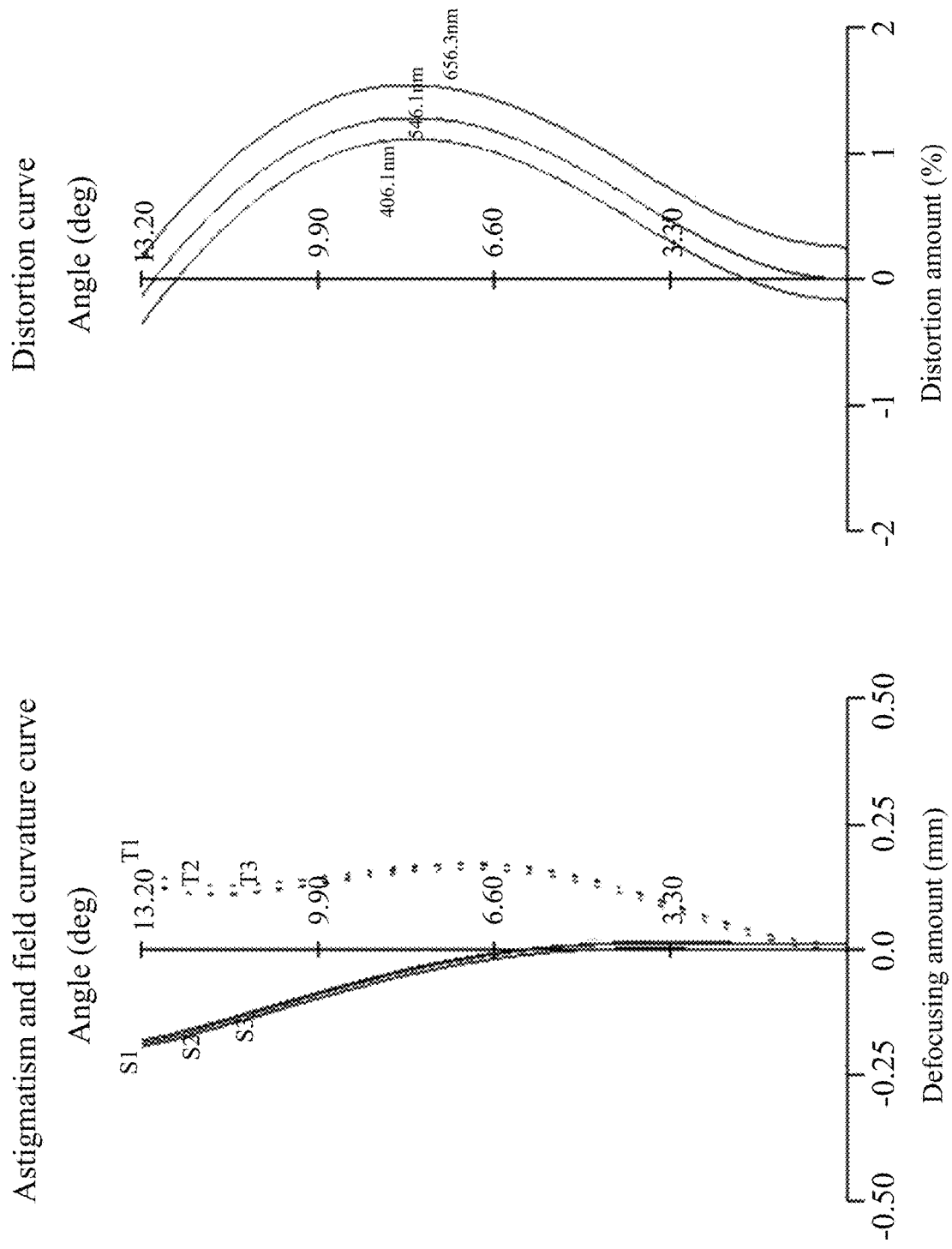
FIG. 3 is a graph of an astigmatism and field curvature curve and a distortion curve in Embodiment 1 of the present invention.
Figure 4:
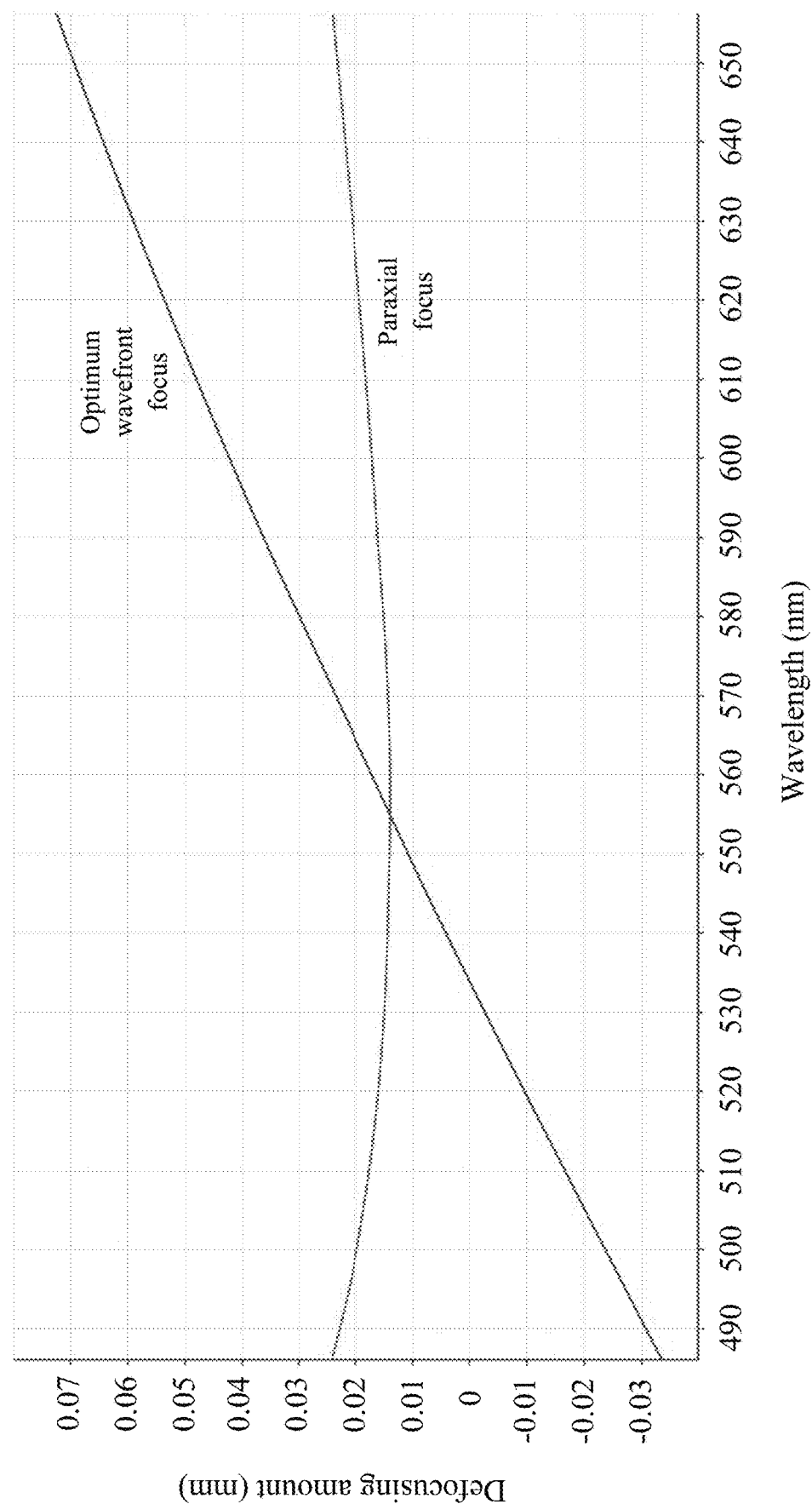
FIG. 4 is a graph of an on-axis chromatic aberration curve according to Embodiment 1 of the present invention.

In summary, it can be seen that the numerical aperture in Embodiment 1 reaches 0.76, which is much larger than 0.2 of the Cooke three-piece lens system, such that the energy utilization rate is significantly increased. An astigmatism and field curvature curve and a distortion curve in Embodiment 1 are shown in FIG. 3, and an on-axis chromatic aberration curve is shown in FIG. 4. It can be seen from the drawings that this optical lens has good imaging quality when applied to a projection imaging system.

Figure 5:
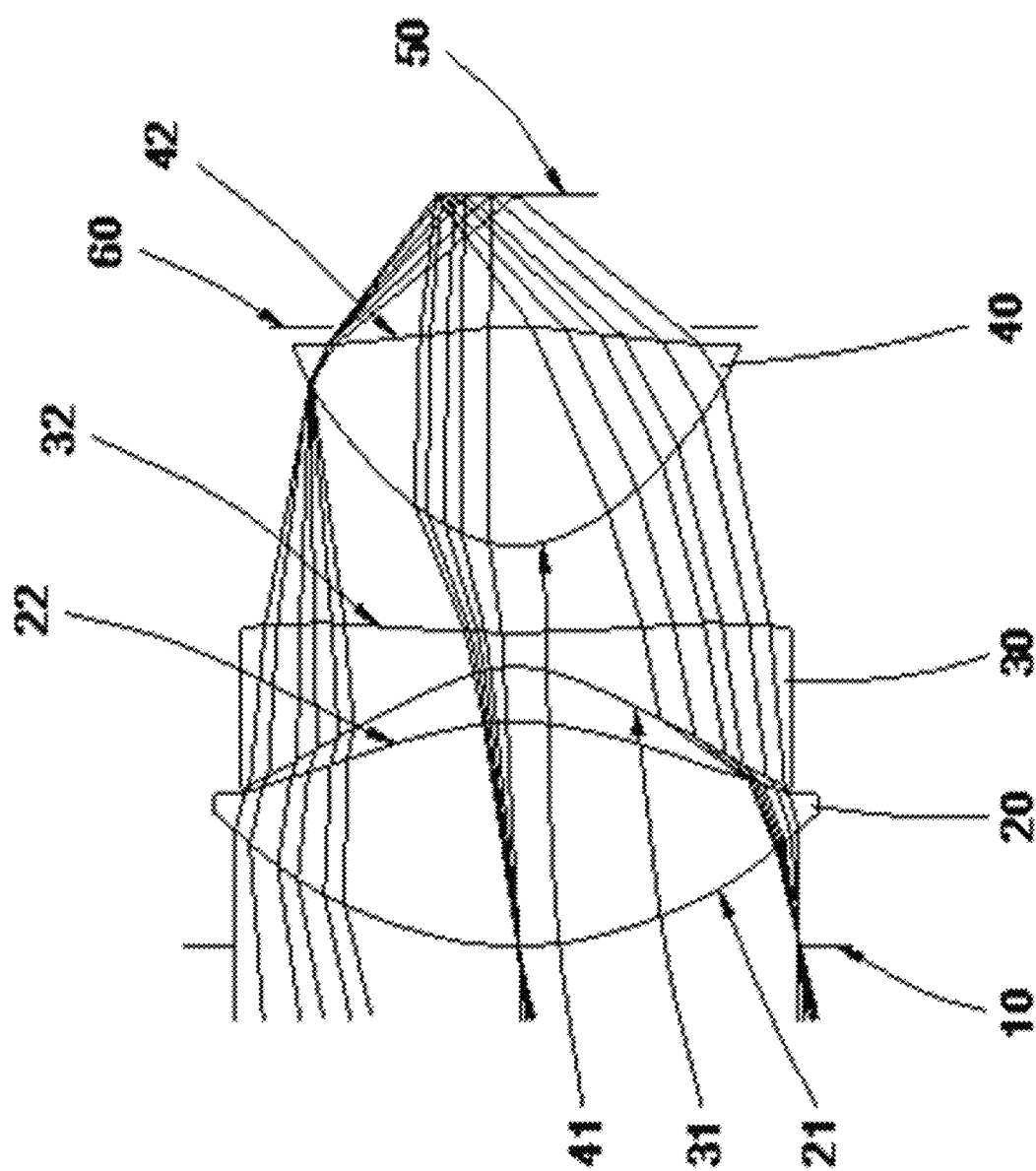
FIG. 5 is a schematic structural diagram of Embodiment 2 in the present invention.

Embodiment 2 is as shown in FIG. 5. The optical lens structure is set according to parameters in Table 5, Table 6, Table 7, and Table 8.

TABLE 5

Parameters of each surface in Embodiment 2

| Surface number | Surface type | Curvature radius r (mm) | Thickness (mm) | Refractive index n | Abbe number Vd | Caliber d |
|---|---|---|---|---|---|---|
| Object plane | Spherical surface | Infinite | 25000 |  |  |  |
| Diaphragm | Spherical surface | Infinite | 0.00 |  | 65 | 42.626 |

TABLE 5-continued

Parameters of each surface in Embodiment 2

| Surface number | Surface type | Curvature radius r (mm) | Thickness (mm) | Refractive index n | Abbe number Vd | Caliber d |
|---|---|---|---|---|---|---|
| S1 | Aspherical surface | 27.64 | 16.84 | 1.492 | 57.98 | 42.658 |
| S2 | Aspherical surface | −20.00 | 4.16 | | | 41.194 |
| S3 | Aspherical surface | −9.15 | 2.60 | 1.584 | 27.86 | 40.504 |
| S4 | Aspherical surface | 58.15 | 6.59 | | | 38.341 |
| S5 | Aspherical surface | 8.72 | 16.44 | 1.492 | 57.98 | 31.543 |
| S6 | Aspherical surface | −23.03 | 10.00 | | | 28.560 |
| S7 | Spherical surface | Infinite | 0.00 | | | 12.583 |

The expression of the aspheric surface is as follows:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

wherein z is a vector height of position r on the aspheric surface; c is a paraxial curvature of the aspheric surface, c=1/r; r is a curvature radius; k is a cone coefficient; and A-J are coefficients of higher order terms.

TABLE 6

Parameters of each aspheric surface in Embodiment 2

| | S1 | S2 | S3 | S4 | S5 | S6 |
|---|---|---|---|---|---|---|
| k | 27.637 | −20.000 | −9.151 | 58.147 | 8.717 | −23.032 |
| A | −0.740 | −7.44E+00 | −4.04E+00 | −1.18E+02 | −1.83E+00 | −5.17E+01 |
| B | 1.35E−06 | 2.91E−06 | 1.84E−06 | −7.70E−06 | 9.93E−06 | 1.15E−05 |
| C | −1.48E−09 | −8.77E−09 | −8.90E−09 | 3.15E−09 | 3.46E−07 | −2.14E−08 |
| D | 0 | 1.24E−11 | 1.06E−11 | 0 | −1.47E−09 | 4.97E−11 |
| E | 0 | 0 | 0 | 0 | 2.62E−12 | 0 |

TABLE 7

Parameters of an optical lens piece in Embodiment 2

| Parameter | Equivalent focal length $f_0$(mm) | $f_1$ (mm) | $f_2$ (mm) | $f_3$ (mm) | Back focal length | f/EPD | Numerical aperture NA | 1/2 FOV(°) |
|---|---|---|---|---|---|---|---|---|
| Value | 26 | 26.6 | −13.21 | 15.45 | 10 | 0.61 | 0.82 | 13.2 |

TABLE 8

Constraint relationship of Embodiment 2

| Constraint conditions | Results |
|---|---|
| |ST-Fobj| < 0.5f | |ST-Fobj| = 12.64, and thus the condition is satisfied. |
| Caliber size di > dj | As can be seen from Table 5, the condition is satisfied. |
| A lens frame is provided on the S6 surface | The vignetting coefficient of 1/2 FOV is 0.42. |
| |R3 < R4| | As can be seen from Table 5, the condition is satisfied. |

TABLE 8-continued

Constraint relationship of Embodiment 2

| Constraint conditions | Results |
|---|---|
| f1 > f3 | As can be seen from Table 5, the condition is satisfied. |
| |R5| < |R6| | As can be seen from Table 5, the condition is satisfied. |
| G12 < G23 | As can be seen from Table 5, the condition is satisfied. |

TABLE 8-continued

Constraint relationship of Embodiment 2

| Constraint conditions | Results |
|---|---|
| The back focal length is greater than 5 mm | As can be seen from Table 7, the back focal length is 10.00 mm, and thus the condition is satisfied. |
| Numerical aperture NA | 0.82 |

Figure 6:
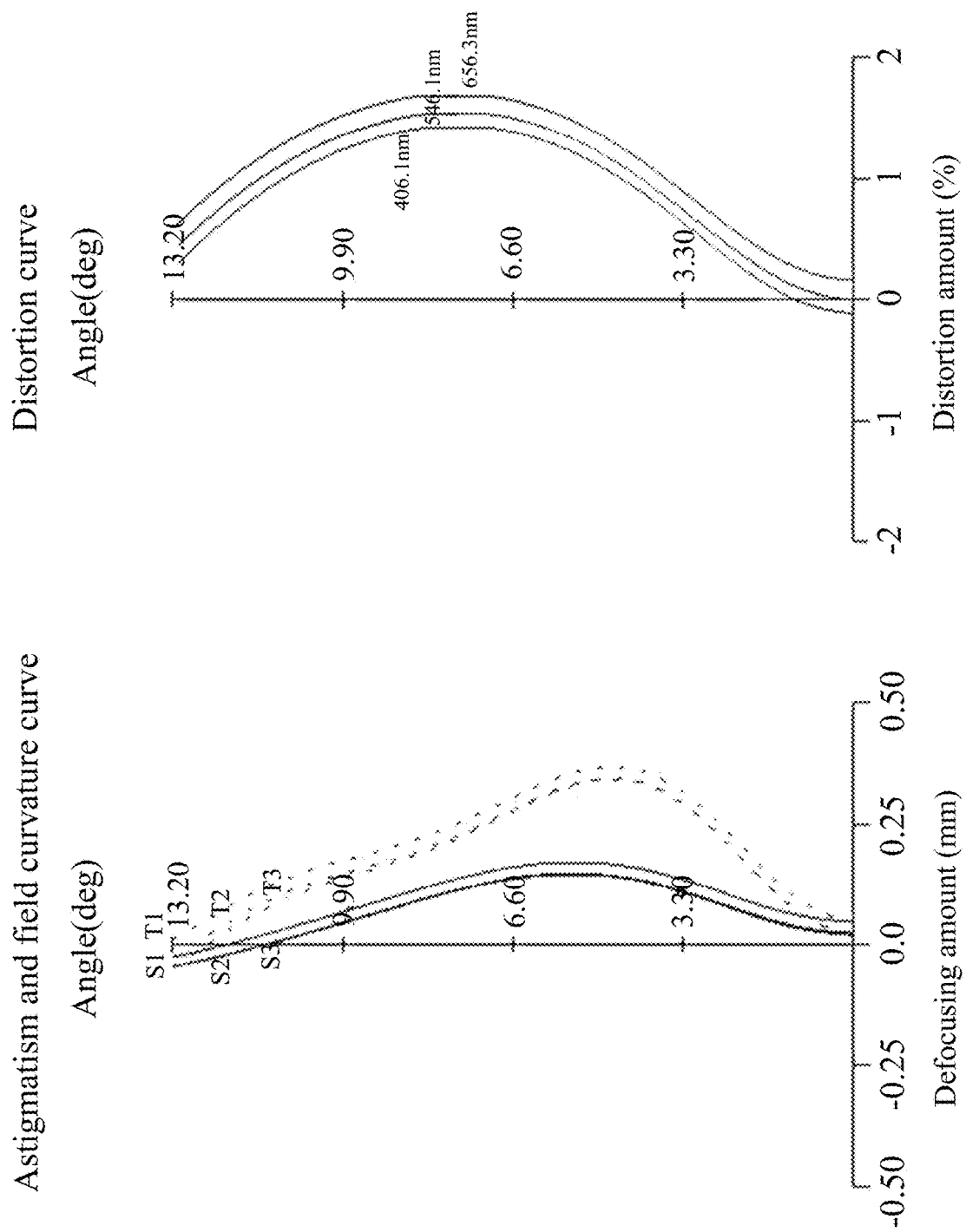
FIG. 6 is a graph of an astigmatism and field curvature curve and a distortion curve in Embodiment 2 of the present invention.
Figure 7:
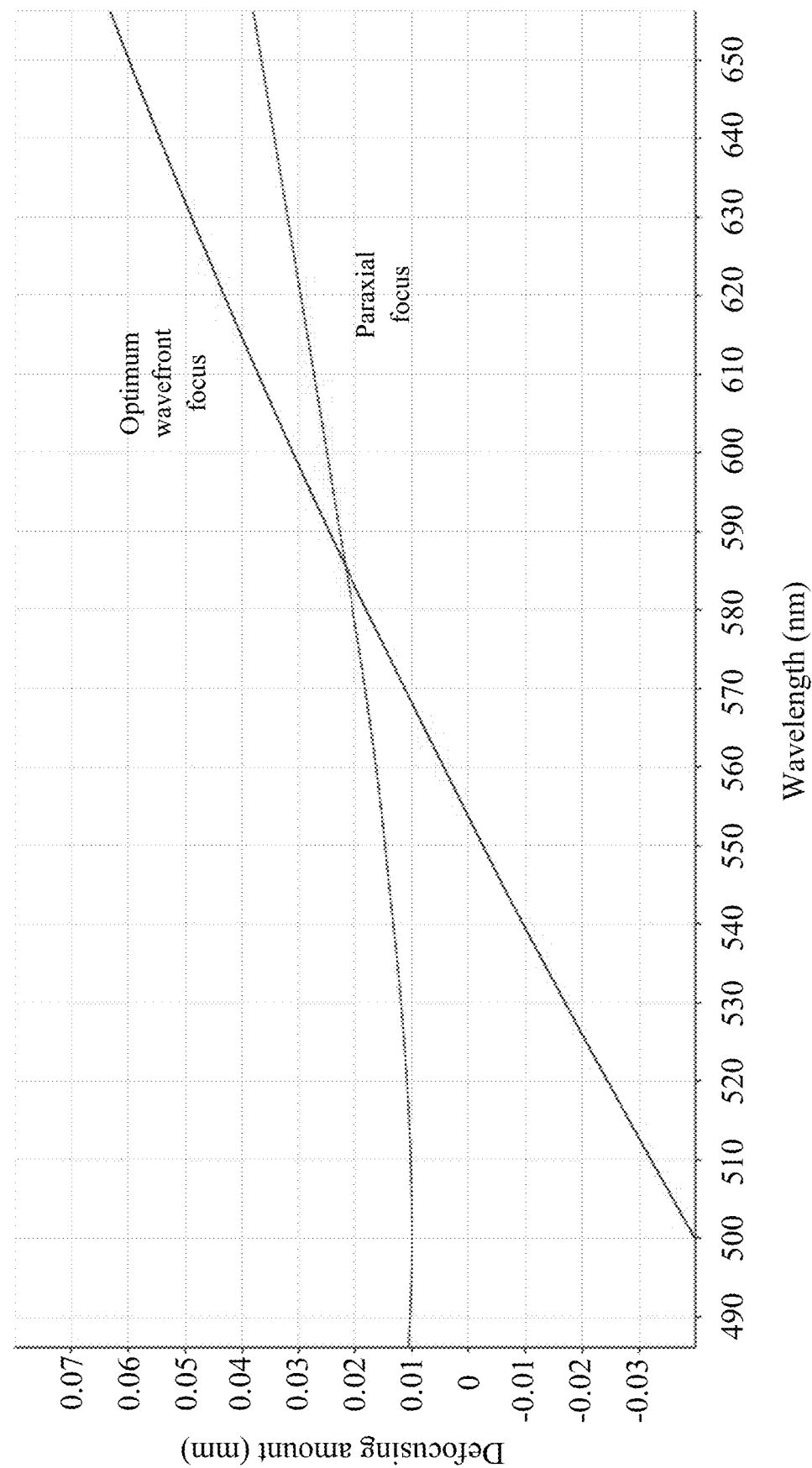
FIG. 7 is an on-axis chromatic aberration curve according to Embodiment 2 of the present invention.

In summary, it can be seen that the numerical aperture in Embodiment 2 reaches 0.82, which is much larger than 0.2 of the Cooke three-piece lens system, such that the energy utilization rate is significantly increased. An astigmatism and field curvature curve and a distortion curve in Embodiment 2 are shown in FIG. 6, and an on-axis chromatic aberration curve is shown in FIG. 7. It can be seen from the drawings that this optical lens has good imaging quality when applied to a projection imaging system.

The above-mentioned embodiments only express several implementations of the present invention, and the description is relatively specific and detailed, but it should not be understood as a limitation to the patent scope of the present invention. It should be pointed out that for those of ordinary skill in the art, without departing from the concept of the present invention, several modifications and improvements can be made, and these all fall within the protection scope of the present invention.

What is claimed is:

1. A large-aperture optical lens, comprising:
    a diaphragm (10),
    a first lens piece (20) having positive focal power,
    a second lens piece (30) having negative focal power, and
    a third lens piece (40) having positive focal power, which are arranged in sequence, wherein
    two surfaces of the first lens piece (20) are an S1 surface (21) and an S2 surface (22) respectively, two surfaces of the second lens piece (30) are an S3 surface (31) and an S4 surface (32) respectively, and two surfaces of the third lens piece (40) are an S5 surface (41) and an S6 surface (42) respectively; the S1 surface (21), the S2 surface (22), the S3 surface (31), the S4 surface (32), the S5 surface (41) and the S6 surface (42) are arranged in sequence; an S7 surface (50) is provided on a side of the S6 surface (42) away from the S5 surface (41), and a lens frame (60) is provided at the S6 surface (42) or between the S6 surface (42) and the S7 surface (50); the S1 surface (21), the S2 surface (22) and the S5 surface (41) are all convex surfaces, and the S3 surface (31) is a concave surface;
    a distance between the diaphragm (10) and an object focus of the lens is $|ST-F_{obj}|$, and an equivalent focal length of the lens is $f_0$, $|ST-F_{obj}|<0.5f_0$;
    the calibers of the S1 surface (21) to the S7 surface (50) sequentially decrease progressively; a curvature radius of the S3 surface (31) is $r_3$, and a curvature radius of the S4 surface (32) is $r_4$, $|r_3|<|r_4|$; a curvature radius of the S5 surface (41) is $r_5$, and a curvature radius of the S6 surface (42) is $r_6$, $|r_5|<|r_6|$; an equivalent focal length of the first lens piece (20) is greater than an equivalent focal length of the third lens piece (40); and
    a center distance between the first lens piece (20) and the second lens piece (30) is $G_{12}$, and a center distance between the second lens piece (30) and the third lens piece (40) is $G_{23}$, $G_{12}<G_{23}$; a back focal length of the lens is greater than 5 mm; and a numerical aperture of the lens is greater than 0.6.

2. The large-aperture optical lens according to claim 1, wherein the S4 surface (32) is a concave surface.

3. The large-aperture optical lens according to claim 1, wherein the S6 surface (42) is a convex surface.

4. The large-aperture optical lens according to claim 1, wherein the S1 surface (21), the S2 surface (22), the S3 surface (31), the S4 surface (32), the S5 surface (41) and the S6 surface (42) are spherical surfaces or aspherical surfaces.

5. The large-aperture optical lens according to claim 1, wherein the first lens piece (20), the second lens piece (30) and the third lens piece (40) are single lens pieces or cemented lens pieces.

6. The large-aperture optical lens according to claim 1, wherein the first lens piece (20), the second lens piece (30) and the third lens piece (40) are glass lens pieces or plastic lens pieces.

7. The large-aperture optical lens according to claim 1, wherein an Abbe number of the first lens piece (20) is $Vd_1$; an Abbe number of the second lens piece (30) is $Vd_2$; and an Abbe number of the first lens piece (40) is $Vd_3$, $Vd_1-Vd_2>25$, $Vd_3-Vd_2>25$.

8. The large-aperture optical lens according to claim 1, wherein a distance between the S6 surface (42) and the S7 surface (50) is greater than 5 mm.

* * * * *